(12) United States Patent
Geier et al.

(10) Patent No.: US 6,577,952 B2
(45) Date of Patent: Jun. 10, 2003

(54) POSITION AND HEADING ERROR-CORRECTION METHOD AND APPARATUS FOR VEHICLE NAVIGATION SYSTEMS

(75) Inventors: George J. Geier, Scottsdale, AZ (US); Russell S. Figor, Mesa, AZ (US); Troy L. Strother, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 72 days.

(21) Appl. No.: 09/756,094

(22) Filed: Jan. 8, 2001

(65) Prior Publication Data

US 2003/0036847 A1 Feb. 20, 2003

(51) Int. Cl.⁷ .......................... G01C 21/00; G08G 1/01; G01P 21/00
(52) U.S. Cl. .......................... 701/214; 340/939; 702/95
(58) Field of Search ...................... 701/1–8, 10, 23–26, 701/36, 93–97, 200, 210, 205–208, 213–217, 220, 300, 224–225; 340/545.2, 545.5, 933, 935, 938–939, 979, 988–995; 702/85–88, 92–95, 99, 116, 104–105, 142–151, 182–185, 194–197; 73/763, 766, 488, 497, 503.3, 509, 510–511; 244/79; 318/466–467, 580, 583–587

(56) References Cited

U.S. PATENT DOCUMENTS

| | | | |
|---|---|---|---|
| 3,702,477 A | 11/1972 | Brown | |
| 3,702,569 A | 11/1972 | Quinn et al. | |
| 4,303,978 A | 12/1981 | Shaw et al. | |
| 4,454,756 A | 6/1984 | Sharp et al. | |
| 4,537,067 A | 8/1985 | Sharp et al. | |
| 4,987,684 A | 1/1991 | Andreas et al. | |
| 5,075,693 A | 12/1991 | McMillan et al. | |
| 5,194,872 A | 3/1993 | Musoff et al. | |
| 5,278,424 A | 1/1994 | Kagawa | |
| 5,297,028 A | * 3/1994 | Ishikawa | 702/96 |
| 5,319,561 A | 6/1994 | Matsuzaki | |
| 5,331,563 A | * 7/1994 | Masumoto et al. | 701/207 |
| 5,339,246 A | 8/1994 | Kao | |
| 5,416,712 A | 5/1995 | Geier et al. | |
| 5,469,158 A | * 11/1995 | Morita | 340/988 |
| 5,505,410 A | 4/1996 | Diesel et al. | |
| 5,527,003 A | * 6/1996 | Diesel et al. | 244/195 |
| 5,543,804 A | 8/1996 | Buchler et al. | |
| 5,583,774 A | 12/1996 | Diesel | |
| 5,680,313 A | 10/1997 | Whittaker et al. | |
| 5,784,029 A | 7/1998 | Geier | |

(List continued on next page.)

OTHER PUBLICATIONS

Kalman, R.E. "A New Approach to Linear Filtering and Prediction Problems ". ASME —Journal of Basic Engineering, 82 (Series D): Copyright 1960, pp 35–45.

Primary Examiner—Thu Nguyen
(74) Attorney, Agent, or Firm—John J. King; Thomas V. Miller

(57) ABSTRACT

The present invention solves the problems of the prior art by providing methods for compensating for temperature-dependent drift of bias in a vehicle heading sensor of a dead reckoning vehicle positioning system. Specifically, the invention uses a Kalman filter to generate a calibration curve for the rate of heading sensor bias drift with temperature change. The Kalman filter calculates coefficients for a model of heading sensor bias drift rate versus temperature at each point where the vehicle is stationary. The bias drift rate calibration curve is then used to estimate a heading sensor bias periodically while the vehicle is moving. The invention further provides a method for using an aging time for temperature sensor bias drift rate to force convergence of the error variance matrix of the Kalman filter. The invention further provides vehicle navigational systems that utilize the methods of the present invention.

29 Claims, 5 Drawing Sheets

U.S. PATENT DOCUMENTS

| | | |
|---|---|---|
| 5,986,547 A | 11/1999 | Korver et al. |
| 6,029,111 A | 2/2000 | Croyle |
| 6,055,477 A | 4/2000 | McBurney et al. |
| 6,091,359 A | 7/2000 | Geier |
| 6,175,807 B1 * | 1/2001 | Buchler et al. .............. 701/202 |
| 6,240,367 B1 | 5/2001 | Lin |
| 6,243,657 B1 | 6/2001 | Tuck et al. |
| 6,249,542 B1 | 6/2001 | Kohli et al. |

* cited by examiner

POSITION AND HEADING ERROR-CORRECTION METHOD AND APPARATUS FOR VEHICLE NAVIGATION SYSTEMS

BACKGROUND OF THE INVENTION

1. Field of the Invention

The present invention relates to navigational systems. Specifically, the invention relates to methods of compensating for bias drift in gyroscopes used in vehicle navigational systems having a dead reckoning component, and subsequently correcting heading and position errors resulting from the gyroscope bias and gyroscope bias drift.

2. Description of Related Art

Numerous automotive navigational systems have been developed in recent years for such applications as providing real-time driving directions and providing emergency services for automobiles. These navigational systems typically include a satellite-based positioning system or a "dead reckoning system" (DRS), or a combination of the two. In a dead reckoning system, the heading and position of a vehicle are determined using sensors such as gyroscopes and odometers. Typically, automobile navigational and positioning systems use a DRS having an interface between a transmission odometer (for tracking speed and distance) and a gyroscope (to track the vehicle's heading). Dead reckoning systems are often used in tandem with a satellite-based navigational system such as a Global Positioning System ("GPS").

The Global Positioning System (GPS) is a satellite-based radionavigation system developed and operated by the U.S. Department of Defense. GPS allows land, sea and airborne users to constantly determine their three-dimensional position, velocity, and time anywhere in the world with a precision and accuracy far better than other radionavigation systems currently available. The GPS consists of three segments: user, space and control. The user segment consists of individual receivers, processors, and antennas that allow land, sea or airborne operators to receive GPS satellite broadcasts and compute their precise position, velocity and time from the information received from the satellites. Use of GPS receivers in automotive navigation, emergency messaging, and tracking systems is now widespread. GPS receivers have been miniaturized to comprise only a few integrated circuits for individual use.

The space segment consists of 24 satellites in orbit around the Earth and positioned so that at any time between five and eight satellites are "in view" to a user at any particular position on the surface of the earth. These satellites continuously broadcast both position and time data to users throughout the world.

The control segment consists of five land-based control and monitoring stations located in Colorado Springs (master control station), Hawaii, Ascension Island, Diego Garcia, and Kwajalein. These stations monitor transmissions from the GPS satellites as well as the operational status of each satellite and its exact position in space. The master ground station transmits corrections for the satellite's position and orbital data back to the satellites. The satellites synchronize their internally stored position and time with the data broadcast by the master control station, and the updated data are reflected in subsequent transmissions to the user's GPS receiver, resulting in improved prediction accuracy.

In general, a minimum of four GPS satellites must be tracked by the receiver to derive a three-dimensional position fix. The fourth satellite is required to solve for the offset between the local time maintained by the receiver's clock and the time maintained by the GPS control segment (i.e., GPS time); given this synchronization, the transit time measurements derived by the receiver can be converted to range measurements and used to perform triangulation. Navigational systems based solely on GPS, therefore, generally do not work well in dense city environments, where signal blockage and reflection by tall buildings, in addition to radio frequency (RF) interference, often occurs. GPS accuracy also suffers in situations where the GPS satellites are obscured from the vehicle's field of view, e.g. when the vehicle is in a tunnel or dense foliage environments.

In combination systems, such as navigational systems having both DR and GPS components, heading and position data from each component are used to compensate for measurement errors occurring in the components. The dual component system also provides a backup system in the event that one component fails, for example, DRS provides continuous heading and position information even when the GPS satellites are obscured from the view of the vehicle, and thus no reliable GPS information is available.

Dead reckoning systems, however, are only as accurate as their component sensors, which are often low-cost and low-fidelity. For example, the gyroscopes typically used in dead reckoning systems are vibrational gyroscopes, which are known to have severe performance limitations. The performance of low-cost gyroscopes is directly correlated to gyroscope bias, a measure of a gyroscope's deviation from an ideal or perfect gyroscope, and bias drift, the rate of change of the bias resulting from changes in environmental conditions over time. Gyroscope bias is determined by the gyroscope's reading at zero angular rate, which a perfect gyroscope would read as zero. Gyroscope biases can be as large as several degrees per second for automotive-quality gyroscopes.

In the case of the commonly used vibrational gyroscope, a vibrating beam is used to determine heading changes. Over time, the vibrational characteristics of the beam change and these changes result in changes in the measured angular rate, even when there is no rotation of the beam, thus producing the gyroscope bias drift. Significantly, bias drift produces a position error that grows quadratically with distance-traveled for a vehicle moving at a constant speed.

The most significant factor in gyroscope bias drift is temperature change. Changes of no more than a fraction of a degree in temperature can produce significant shifts in the gyroscope bias. For example, a bias of only 0.055 deg/sec produces a position error of 5% of distance-traveled, or 50 meters, after 1 kilometer of travel and 25% of distance-traveled, or 1.25 kilometers, after 5 kilometers of travel. While the position error can be compensated for using GPS under conditions where a minimum of four satellites are in view of the vehicle, the error cannot be effectively compensated for during periods of GPS outage such as occur in tunnels or dense foliage environments. It is therefore desirable to have methods for correcting heading and position errors in dead reckoning systems resulting from the temperature dependence of gyroscope bias and gyroscope bias drift.

Compensation for temperature-dependent bias drift is further complicated because the system exhibits a hysteresis effect. In a hysteretic system, the dependent variable (gyroscope bias) is not only a function of the independent variable (temperature), but is also a function of the time history of the dependent variable. Therefore, the system is not perfectly reversible. If a gyroscope is subjected to a temperature change and then subjected to a temperature change of the same rate and magnitude in the reverse direction, the temperature dependence of the bias can be different along the forward and reverse paths.

Methods for correcting heading and position errors in vehicle navigation systems, including methods of compensating for gyroscope bias, are known in the art. Most existing methods, however, use estimated positions determined by the dead reckoning or GPS components to correct for gyroscope bias. Other existing methods rely on predetermined calibration curves for gyroscope bias and bias drift. Further alternative existing methods are useful only for high-end gyroscopes that are too expensive for routine use in consumer automotive positioning systems.

U.S. Pat. No. 3,702,477 to Brown teaches a Kalman filter method for estimating the gyroscope bias of an aircraft-quality inertial measurement unit comprising at least three gyroscopes and three accelerometers, using position error measurements constructed from the Navy Navigation Satellite System, a predecessor to GPS.

U.S. Pat. No. 3,702,569 to Quinn et al. discloses a hardware modification for removing the relatively large, fixed offset that appears in high-precision gyroscopes. The modification is applicable to precision gyroscopes typically costing several thousand dollars, rather than the low-cost gyroscopes used in vehicular navigation and positioning systems.

U.S. Pat. No. 4,303,978 to Shaw et al. teaches one-time factory calibration of high-end gyroscopes based upon a predetermined calibration curve. Such methods are not useful for low-cost gyroscopes where calibration curves are not readily determinable.

U.S. Pat. Nos. 4,537,067 and 4,454,756 to Sharp et al. teach compensation for temperature-dependent gyroscope bias drift by controlling the temperature of the gyroscope environment and estimating gyroscope bias using inertial navigation system (INS) position data.

U.S. Pat. No. 4,987,684 to Andreas et al. teaches a method of compensating for gyroscope drift in an inertial survey system by using position updates generated by a Kalman filter method.

U.S. Pat. No. 5,194,872 to Musoff et al. teaches a method of compensating for gyroscope bias in an aircraft inertial navigation system (INS) by using output from a set of redundant gyroscopes to correlate bias.

U.S. Pat. No. 5,278,424 to Kagawa teaches a method of compensating for gyroscope using position information obtained from a digital map database.

U.S. Pat. No. 5,297,028 to Ishikawa and U.S. Pat. No. 5,527,003 to Diesel et al. teach a method of compensating for temperature-dependent gyroscope bias by determining and applying a calibration curve for gyroscope bias as a function of temperature.

U.S. Pat. No. 5,416,712 to Geier et al. discloses use of a Kalman filter method for correcting future heading and position error growth, based upon an assumption of constant gyroscope bias drift rate between position updates.

U.S. Pat. No. 5,505,410 to Diesel et al. and U.S. Pat. No. 5,574,650 to Diesel teach a method for correcting the east component of gyroscope bias from measurements of cross-track velocity error made when an aircraft is taxing.

U.S. Pat. No. 5,543,804 to Buchler et al. teaches a method for combining GPS and inertial navigation systems data for improved attitude determination accuracy that incorporates a Kalman filter method for estimating the gyroscope biases of the INS.

U.S. Pat. No. 5,583,774 to Diesel teaches calibration of gyroscope bias using GPS position and velocity data.

There remains a need in the art for methods compensating for temperature-dependent gyroscope bias drift in low-cost, vehicular navigation an and for the position and heading errors that result from gyroscope bias and gyroscope bias drift, as well as devices incorporating such compensation methods.

SUMMARY OF THE INVENTION

The present invention solves the problems of the prior art by providing methods and apparatuses for compensating for temperature-dependent drift of bias in a heading sensor used in a dead reckoning system for providing a vehicle heading and position.

In a first aspect, the invention provides methods that use a Kalman filter to generate a calibration curve for the rate of heading sensor bias drift with temperature change. The Kalman filter calculates coefficients for a model of bias drift rate versus temperature at each point where the vehicle is stationary. The bias drift rate calibration curve is then used to estimate a heading sensor bias periodically while the vehicle is moving. The invention further provides a method for using an aging time for temperature sensor bias drift rate to force convergence of the error variance matrix of the Kalman filter.

In a second aspect, the invention provides vehicle navigational systems that utilize the heading sensor bias drift rate estimated by the methods of the present invention to correct vehicle headings and positions calculated by the dead reckoning system. Preferred embodiments of the navigational systems of the invention comprise a heading sensor, a distance-traveled sensor, a temperature sensor, and a DRS that receives heading and position data from the heading sensor, the distance-traveled sensor, and the temperature sensor, and a computational means for estimating the heading sensor bias drift rate. In preferred embodiments, the heading sensor is a gyroscope. In particularly preferred embodiments, the heading sensor is a low-cost gyroscope.

In a third aspect, the invention provides vehicle navigational systems that utilize the methods of the present invention in conjunction with a vehicle reference position system to correct vehicle headings and positions determined by the dead reckoning component and the vehicle reference position system. In preferred embodiments, the vehicle reference position system is a satellite-based vehicle positioning system. In particularly preferred embodiments, the vehicle reference position system is the global positioning system.

These as well as other features and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF PREFERRED EMBODIMENTS

The present invention provides methods for compensating for temperature-dependent drift of bias in a heading sensor. In preferred embodiments, a Kalman filter is used to generate a calibration curve for the rate of bias drift with temperature change. In a further preferred embodiment, the invention provides a method for using an aging time for temperature sensor bias drift rate to force convergence of the error variance matrix of the Kalman filter. The invention further provides vehicle navigational systems that utilize the methods of the present invention.

As used herein, the term "vehicle" refers to any land-, air-, or water-based transportation mechanism, including, but not limited to automobiles, airplanes, helicopters, and boats.

As used herein, the term "gyroscope bias" refers to a measure of a gyroscope's deviation from an ideal or perfect gyroscope, and is determined by the gyroscope's reading at zero angular rate, which a perfect gyroscope would read as zero.

As used herein, the term "bias drift" refers to the tendency of the gyroscope bias to change over time in response to environmental changes. Bias drift is affected by factors including temperature changes, vehicle acceleration, local magnetic effects, and hours of usage.

As used herein, the term "GPS time" refers to a measure of time maintained by the GPS master control station. The term "GPS second" refers to a particular measure of GPS time. GPS satellites maintain an internal time that is calibrated with transmissions of GPS time in GPS seconds from the master control station. As used herein, the term "time offset" refers to the difference between GPS time and the time maintained by a GPS processor in a vehicle navigational system, which is not continuously synchronized with GPS time.

As used herein, the term "computational means" refers to a computer hardware or software based element for performing formulas, equations or steps of an algorithm.

Standard linear algebra conventions and terminology are used throughout the specification. A uncapitalized bold letter indicates a vector (e.g. x), a capitalized bold letter indicates a matrix (e.g. P), a superscript T indicates the transpose of the vector or matrix (e.g. $x^T$, $P^T$), and a negative one superscript indicates the inverse of a matrix (e.g. $P^{-1}$).

Figure 1:
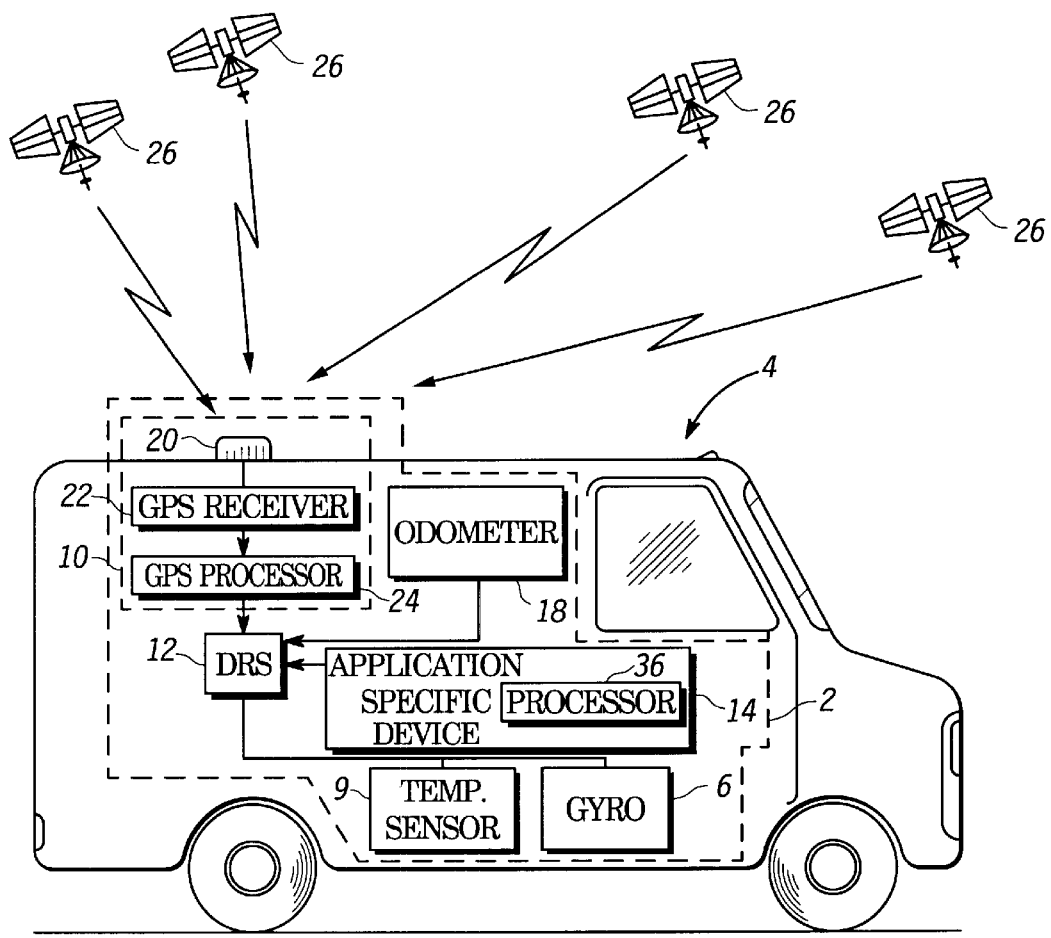
FIG. 1 illustrates a vehicle in which a DR system has been installed.

FIG. 1 illustrates a particularly preferred embodiment of a navigational system 2 for a vehicle 4 comprising a heading sensor 6, a distance-traveled sensor 18, a temperature sensor 9, a DRS 12 that receives heading and position data from the heading sensor 6, the distance-traveled sensor 18, and the temperature sensor 9. In a preferred embodiment, navigational system 2 further comprises a vehicle reference position system 10. In a further preferred embodiment, navigational system 2 further comprises an application specific device ("ASD") 14 that receives heading and position data from the DRS 12. The inventive methods provided herein, however, may be used with any vehicle navigational system 2 having a DRS and do not require that navigational system 2 include a vehicle reference position system 10 or an ASD 14.

Heading sensor 6 may be located anywhere in vehicle 4. Preferably, heading sensor 6 is a gyroscope. When heading sensor 6 is a gyroscope, the axis of the gyroscope that measures angular velocity ("sensitive axis") must be oriented toward the local vertical to sense the rate of change in heading. If the sensitive axis of the gyroscope is horizontally oriented, the gyroscope would measure the pitch rate of vehicle 4 rather than heading change. The invention is preferably used with low-cost gyroscopes such as those available from Murata, Matsushista/Panasonic, and Tokin. Gyroscope output is typically analog and in units of voltage. The gyroscope has a bias, or an offset reading at zero angular velocity, that is time dependent.

Distance-traveled sensor 18 is preferably an odometer 18; however, the invention is not limited to such an embodiment. There are two fundamental types of odometers 18 known to those in the art: reluctant sensors, which use passive magnetic flux change to measure velocity, and Hall effect sensors, which are active and detect wheel rotations. The preferred system and method will work with any pre-installed odometer 18 in vehicle 4; however, the invention preferably uses a reluctance sensor-based odometer. Odometer 18 output is typically in units of pulse counts when a Hall effect sensor is used. Each pulse in the pulse count refers to a specific amount of wheel rotation, preferably $1/24^{th}$ to $1/48^{th}$ of the circumference of a tire. Those of skill in the art will recognize that alternative velocity or distance-traveled sensors, including but not limited to Doppler radar installed underneath vehicle 4 or one or more lateral accelerometers, would be equally useful in the invention.

Temperature sensor 9 may be any commercially available temperature sensor. Preferably, temperature sensor 9 has a resolution of 0.1 degrees C. The temperature sensor 9 is preferably positioned in close proximity to the heading sensor 6, and is preferably not positioned near an element of the vehicle that is subject to rapid changes in temperature, such as the engine. Most preferably, the temperature sensor 9 is located within the housing of the heading sensor 6. However, as most low-cost gyroscopes used in automotive navigational applications are bought off the shelf, and the warranty of the gyroscope may be voided by opening the housing, placement of the temperature sensor 6 in a gyroscope housing may not be feasible. In this situation, it is desirable to have the temperature sensor positioned in the same housing as that of the vehicle reference position system 10. The output of temperature sensor 9 is typically in units of volts.

Preferably, vehicle reference position system 10 comprises a satellite-based vehicle positioning system, including systems based on GPS, GLONASS, or Galileo satellites. Most preferably, vehicle reference position system 10 comprises a GPS system. More specifically, vehicle reference position system 10 preferably comprises a GPS antenna 20 and a GPS receiver 22 in communication with GPS antenna 20. Vehicle reference position system 10 also preferably comprises a GPS processor 24. GPS satellites 26 transmit heading and position data information to vehicle reference position system 10. Satellite 26 transmissions are received by GPS antenna 20 and transmitted to GPS receiver 22. Data from four GPS satellites 26 is typically required for GPS processor 24 to determine a three-dimensional position fix (latitude, longitude, and altitude) and velocity for vehicle 4. Data from three of the GPS satellites 26 is used to triangulate the position of vehicle 4, while data from the fourth satellite 20 provides a time offset.

Figure 6:
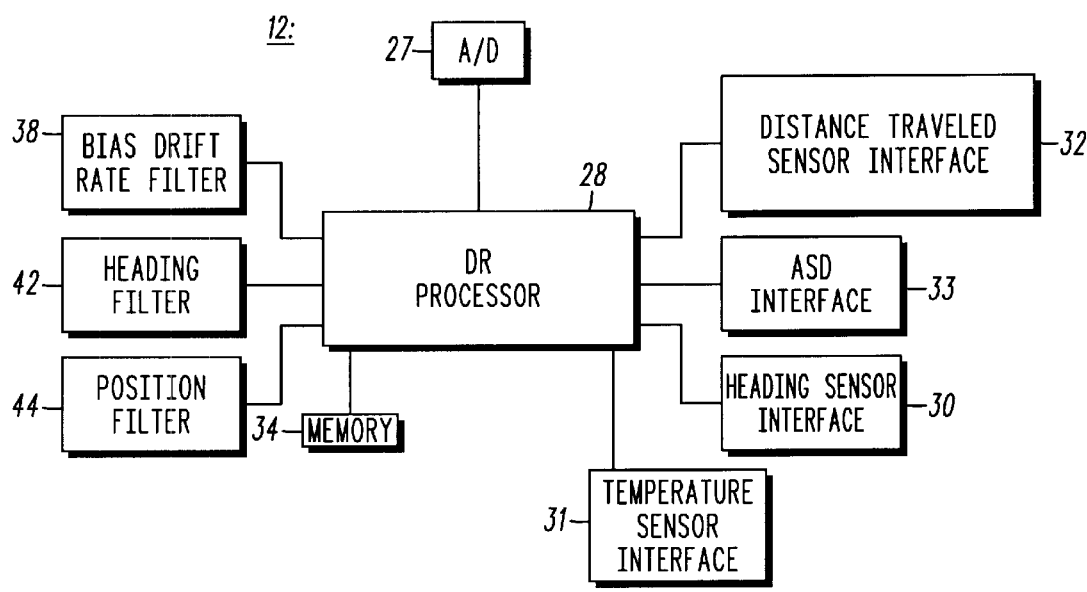
FIG. 6 is an illustration of one embodiment of a dead reckoning system (DRS).

Referring to FIG. 6, DRS 12 preferably comprises an analog-to-digital converter ("A/D converter") 27, a DR processor 28, a heading sensor interface 30, a temperature sensor interface 31, a distance-traveled sensor interface 32, an ASD interface 33, and a memory 34. DRS 12 also preferably comprises a bias drift rate filter 38, a heading filter 42, and a position filter 44. Preferably distance-traveled sensor interface 32 and heading sensor interface 30 are ports. DRS 12 receives heading change data from heading sensor 6 via heading sensor interface 30 and distance-traveled data from the distance-traveled sensor 18 via distance-traveled sensor interface 32. When vehicle navigational system 2 includes a reference position system 10, DRS 12 also receives reference heading and position system from reference position system 10. In embodiments where reference position system 10 is a GPS system, DRS 12 also receives reference heading and position from GPS receiver 22.

DRS 12 converts the heading sensor output to a heading change in units of degrees or radians, the distance-traveled sensor 18 output to units of meters, and the temperature sensor 9 outputs to units of degrees C. DRS 12 then integrates GPS heading and position data with heading and position data received from heading sensor 6 and distance-traveled sensor 18 to determine the current heading and position of vehicle 4. DR processor 28 also transmits the integrated heading and position data to ASD 14 via ASD interface 33. In a preferred embodiment, DRS 12 is preferably integrated into GPS receiver 22. In such embodiments, GPS receiver 22 preferably further comprises an analog-to-digital converter for converting the output of heading sensor 6 and distance-traveled sensor 18 to digital signals.

For automotive vehicle navigation applications, ASD 14 may include, but is not limited to, a map-matching and display unit for providing driving directions or a system for transmitting a vehicle's position to an emergency call service ("ECS"). The invention is not limited to these embodiments, however, and those of skill in the art will recognize the utility of the invention for any application that requires heading and position data. Preferably ASD 14 includes a separate processor 36 (as shown in FIG. 1). In a particularly preferred embodiment, the ASD processor 36 may be embedded in GPS receiver 22. In an alternative preferred embodiment, the GPS processor 24 may be embedded in ASD 14.

ASD 14 may provide an interface to a cellular phone or radio for establishing a. communication link to a nearby service center, emergency call center or other third party that requires tracking of vehicle 4. In these embodiments, the vehicle 4 transmits accumulated heading and position data, along with heading sensor bias data, to the service center, emergency call center or other third party. The methods of the invention are then used offline in non-real-time to determine a corrected heading and position for vehicle 4. Examples of such non-real time systems include existing GPS applications such as the General Motors Onstar System. the stationary period time scale is indicated by the subscript k. Preferably the constant period time scale is 1 Hz.

Heading sensor 6 bias drift rate is updated at stationary points, while the heading and position of vehicle 4 are preferably updated continuously using the constant period time scale. In an alternative preferred embodiment, the heading of vehicle 4 is updated continuously using the constant period time scale and the position of vehicle 4 is updated only when the accumulated heading change has reached a minimum value, in order to preserve computational cycles. In these embodiments, the position of vehicle 4 is preferably updated when the heading change is between about 0.1 and about 2.0 degrees, more preferably when the heading change is between about 0.2 and about 1.0 degrees, and most preferably when the heading change is about 0.5 degrees.

Figure 7:
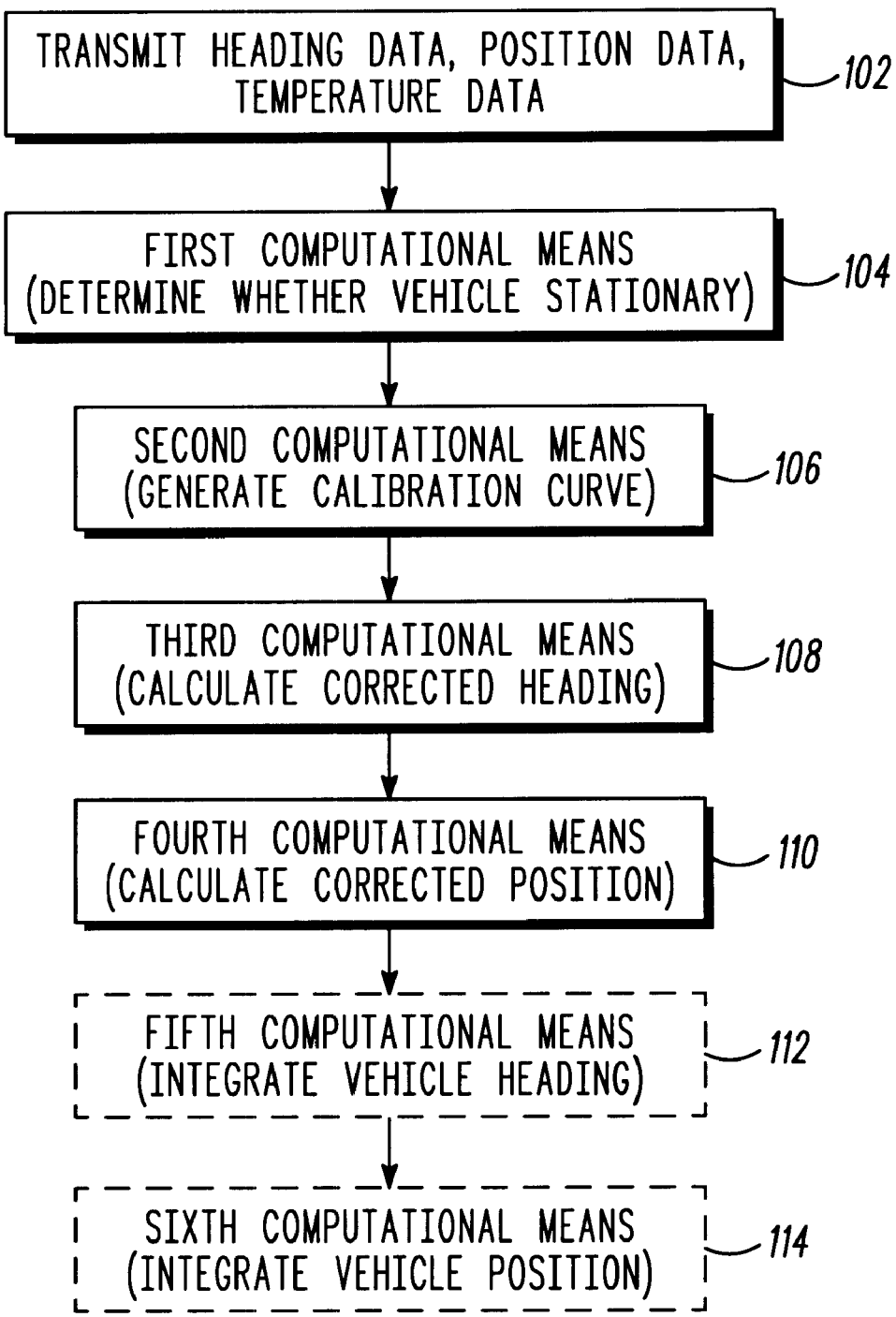
FIG. 7 is a block diagram of one embodiment of the present invention.

Referring to FIG. 7, the initial step (block 102) of a preferred method is transmitting heading data from heading sensor 6 ($\Delta H_S$), position data from distance-traveled sensor 18 ($P_S$), and temperature data from temperature sensor 9 ($T_S$), to DRS 12, via heading sensor interface 30, distance-traveled sensor interface 32, and temperature sensor interface 31 respectively. DR processor 28 then converts the data received from analog data ($\Delta H_S$, $P_S$, $T_S$) to digital data ($\Delta H_D$, $P_D$, $T_D$) having units usable by the correction method. Conversion of the data from the analog to a digital signal results in a quantization error, which is accounted for in the heading sensor bias update procedure, as discussed below.

The method next uses a first computational means (block 104 in FIG. 7) to determine whether the vehicle is stationary. Several methods are useful for determining whether the vehicle is stationary. If a Hall-effect sensor is used in the odometer, a single zero pulse count is a reliable indication of a stationary condition. If a reluctance sensor is used in the odometer, the odometer can read zero at very low speed (when the vehicle may be turning), and thus more that one successive zero reading is required to indicate a stationary condition. The number of successive zero readings required is dependent on the sensor used, the driver, and the driving conditions; however, for sensors commonly used in automotive applications, five to ten successive zero readings is sufficient to indicate a stationary condition. The number of successive zero readings required should be selected based on a balance between a conservative estimate that may miss short duration stationary points and an overly optimistic estimate that may indicate more stationary periods than actually occur. Alternatively, the method taught in pending U.S. application Ser. No. 08/834,966, filed Apr. 7, 1997, entitled "Methods of Gyro Bias Estimation Using GPS," now abandoned, which is incorporated herein by reference, can be used. That method uses GPS measurements collected over a period of at least one second to determine whether the vehicle is stationary.

If the vehicle is stationary, a second computational means (block 106 in FIG. 7) is used to update the heading sensor bias drift rate (r) and calculate a temperature-based calibration curve for heading sensor bias. Preferably, the second computational means is a heading sensor bias drift rate filter 38 (hereinafter "bias drift rate filter 38"). As input, bias drift rate filter 38 receives the heading sensor reading while the vehicle is stationary ($\Delta H_D(t_k)$) and the temperature reading at that point ($T_D(k)$). Bias drift rate filter 38 is preferably a Kalman filter, as the Kalman filter can appropriately model both the quantization error associated with the analog to digital conversion of heading sensor data, distance-traveled sensor data and temperature sensor data, and the expected stability of the bias from past measurements.

The discrete Kalman filter is a set of mathematical equations that provides an efficient, recursive, computational solution of the least-squares method with samples at discrete time intervals. The Kalman filter allows for estimations of past, present and future events. The Kalman filtering process is well-known by those in the art, and was initially described in Kalman, R. E., "A New Approach to Linear Filtering and Prediction Problems," J. Basic Eng., March 1960, pp. 35–45. The standard equations used in the Kalman filter are:

$$G_n = P_n^* H_n^T (H_n P_n^* H_n^T + V_n)^{-1}$$

$$P_n = P_n^* - G_n (H_n P_n^* H_n^T + V_n) G_n^T$$

$$x_n = x_n' + G_n (y_n - \hat{y}_n')$$

$$x'_{n+1} = \Phi_n x_n$$

$$P_n^* = \Phi_{n-1} P_n \Phi_{n-1}^T + Q_{n-1}$$

where $\Delta t$ = time increment between $t_n$ and $t_{n+1}$ $\Phi_n$ = state transition matrix $x_n$ = true state at time $t_n$ $x'_n$ = optimum estimate of x after using all of the measured data through $y_n$ $x'_{n+1}$ = optimum estimate of x after using all of the measured data through $y_{n+1}$ $G_n$ = Kalman gain matrix $y_n$ = measurement at time $t_n$ $\hat{y}_n' = H_n x_n$ $P_n^*$ = covariance matrix of the estimation error $(x_n' - x_n)\sigma^*$ $P_n$ = covariance matrix of the estimation error $(x_n' - x_n)$ $H_n$ = measurement matrix $V_n$ = covariance matrix of the measurement error by $\delta y_n$ $Q_n$ = covariance matrix of the response of the states to all white noise driving functions.

Using initial estimates for the state vector ($x_0$) and the error covariance matrix ($P_0$), a new state vector can be estimated at any subsequent time. Numerous publications detail the application of the Kalman filter. See, e.g., Haykin, *Adaptive Filter Theory* 2d. ed. (1991). As the Kalman filter approach is well understood by those of skill in the art and will not be discussed farther herein.

Drift Modeling Algorithm

When the vehicle is determined to be stationary, the gyroscope bias is equivalent to the gyroscope reading. The gyroscope bias drift rate at the current stationary period $((r'''')_k)$ is calculated by dividing the change in measured bias between stationary periods by the change in temperature between stationary periods, where the current stationary period is represented by k, and the previous stationary period is represented by k−1 as shown in Equation 1 below:

$$(r''')_k = (b_k - b_{k-1})/\Delta T \quad (1)$$

where $\Delta T = T_k - T_{k-1}$; $T_k$ denotes the measured temperature at the current stationary period $t_k$; $T_{k-1}$ denotes the measured temperature at the previous stationary period $t_{k-1}$; $b_k$ denotes the gyroscope bias estimate at the current stationary period $t_k$; and $b_{k-1}$ denotes the gyroscope bias estimate at the previous stationary period $t_{k-1}$.

The gyroscope bias rate measurement is considered valid at the average of these two temperature measurements, $T_{avg}$:

$$T_{avg} = (T_k + T_{k-1})/2 \quad (2)$$

The Kalman filter algorithm preferably models the temperature dependence of the gyroscope bias drift rate as a second order polynomial in ($T_{avg} - T_0$) where $T_0$ is a reference temperature in the gyroscope's expected operating range (e.g. 40 degrees Celsius). The reference temperature is dependent on the sensor used, and preferably is selected near the midpoint of the expected operating temperature range of the gyroscope, since excessive departures from the reference temperature may reduce the applicability of the model (i.e., lead to selection of a higher order polynomial, which will increase the computational complexity). A second order polynomial represents a reasonable compromise between fidelity and complexity. While higher order models may represent the temperature curve more precisely, the increased complexity attendant with the increased fidelity adds to the computational burden on the system. The second order temperature model is shown in Equation 3:

$$r''' = r_0 + r_1(T_{avg} - T_0) + r_2(T_{avg} - T_0)^2 \quad (3)$$

The coefficients of the second order polynomial, $r_0$, $r_1$, and $r_2$ are the components of the state vector for the Kalman filter, as shown in Equation 4.

$$x^T = [r_0 \, r_1 \, r_2] \quad (4)$$

Thus, as opposed to the methods of the prior art, the present invention provides for adaptation of a non-static gyroscope bias compensation curve to stabilize the gyroscope bias drift.

The measurement gradient vector, h, for the Kalman filter relates the measurements of gyroscope bias drift rate to the state vector estimate, and is determined using Equation 5:

$$r''' = h^T x \quad (5)$$

Therefore, the measurement gradient vector is:

$$h^T = [1 \, (T_{avg} - T_0) \, (T_{avg} - T_0)^2] \quad (6)$$

The rate measurement error variance, $\sigma_{rm}^2$, is computed using Equation 7 below:

$$\sigma_{rm}^2 = (\sigma_k^2 + \sigma_{k-1}^2 + ((r''')^2 \sigma_Q^2))/\Delta T^2 \quad (7)$$

where $\sigma_k^2$ and $\sigma_{k-1}^2$ are the error variances associated with the gyroscope bias estimates at the current stationary period and the previous stationary period respectively, and $\sigma_Q^2$ is the error variance associated with the temperature sensor quantization ($Q^2/3$, where Q is the quantization level). The value of the error variance associated with the temperature quantization is based on a uniform probability density function (i.e., all errors less than the quantization level are equally likely).

The error covariance matrix associated with the curve fit polynomial coefficients, P, is initialized to a "steady state" value, corresponding to no knowledge of the temperature coefficients:

$$P_0 = diag\{\sigma_0^2 \, \sigma_1^2 \, \sigma_2^2\} = \begin{bmatrix} \sigma_0^2 & 0 & 0 \\ 0 & \sigma_1^2 & 0 \\ 0 & 0 & \sigma_2^2 \end{bmatrix} \quad (8)$$

P represents the covariance matrix computed and implemented by the Kalman filter algorithm. The elements of the error covariance matrix P represent the uncertainty level associated with the curve fit coefficients, $r_0$, $r_1$, and $r_2$. The diagonal elements of error covariance matrix P represent the uncertainty levels associated with the estimates derived by the Kalman filter, and the off-diagonal elements represent the correlation between the error in a given estimate and the error in a separate estimate. The elements of the error covariance matrix preferably have small values, as this indicates a high confidence level in the estimates. The diagonal elements of the initial error covariance matrix $P_0$ represent the statistical characterization of the temperature coefficients of an uncompensated gyroscope. The diagonal elements of the initial error covariance matrix $P_0$ vary from gyroscope to gyroscope, and preferably are determined by laboratory testing.

The algorithm of the present invention includes a novel method for performing forward estimates of the error variance in time. This method assumes an a priori "aging time"

(τ) that represents the expected time interval over which the temperature coefficients fill remain relatively constant. Preferably, the aging time is based on experience with a particular gyroscope; however, such experience is not necessary for the method of the invention, as the method will successfully adapt for a reasonable assumption as to aging time. In embodiments where the aging time is not based on experience, the aging time should be selected using conservative rules, i.e., a low value for τ should be selected to force the invention to revise the model more frequently, thereby hastening convergence of the aging time.

The error variance propagation is calculated using Equation 9:

$$P_k = P_{k-1} + (\Delta t/\tau)\Delta P \quad (9)$$

where $\Delta t$ is the is the time interval over which the covariance information is propagated $(t-t_{k-1})$; $\Delta P = P_0 - P_{k-1}$; and $\tau$ is the aging time associated with the coefficients.

The factor $(\Delta t/\tau)$ in Equation (9) represents a Taylor series approximation to an exponential in $(\Delta t/\tau)$ as the state transition matrix is a negative exponential in $\Delta t/\tau$. While the approximation of the covariance matrix can theoretically have a value of $(\Delta t/\tau)$ greater than one, this would represent a decay to a negative value, and therefore an upper limit of unity is imposed on the value of $(\Delta t/\tau)$.

The aging time τ is not known a priori with confidence, and therefore the method adapts the aging time over time. Upper and lower limits for the aging time are imposed, e.g. 2 days for the minimum and 10 days for the maximum. The aging time is adapted using a statistic that indicates the consistency of the polynomial curve fit to the gyroscope bias measurement data. This statistic, $z^2_{norm}$, is calculated using Equation 10:

$$z^2_{norm} = z^2/\sigma_{res} = (r^m - h^T x)^2 / h^T Ph + \sigma_{rm}^2 \quad (10)$$

where z is the residual of the Kalman filter, $r^m - h^T x$, and $\sigma^2_{res} = h^T Ph + \sigma_{rm}^2$ represents the variance associated with the residual. The residual, z, represents the difference between the gyroscope bias measurement and the expected measurement of the Kalman filter.

The normalized residual square represents the discrepancy of the measured gyroscope temperature rate from the polynomial curve fit divided by expected uncertainty level of the residual. If the temperature dependence of the gyroscope bias drift rate is well modeled by the polynomial curve fit, the residual will be small. A persistently large value, on the other hand, is indicative of model error. The magnitude of the residual is defined in terms of a Gaussian distribution, i.e., the error is distributed in the familiar bell curve. Under the assumption of a Gaussian distribution, 67% of the values of the residual should be less than 1, 95% should be less than 4 and 99% should be less than 9. A value for the residual greater than 9 is unlikely to be generated by the current model because of the Gaussian assumption, i.e., it has a probability of 1% associated with it.

The validity of the polynomial model is tested using a model validity parameter, p. The model validity parameter is calculated from the average value of the normalized squared residuals across some number, N, of stationary periods of the DR system. As shown in Equation 11:

$$p = (\Sigma z^2_{norm})/N \text{ for } N \geq N_{min} \quad (11)$$

where N is the number of stationary periods. The number of stationary periods must reach some minimum value, $N_{min}$, for p to be a valid statistic. Preferably $N_{min}$ is about 10. Until the number of stationary periods equals $N_{min}$, the aging time is not adapted. It is desirable for the validity parameter p to have a value of one. When p is much less than one, the model is overly conservative, and therefore the aging time should be decreased. Conversely, when p is much larger than one, the model is overly optimistic, and the aging time should be increased.

The change in the aging time, $\Delta\tau$, required for convergence of the model validity parameter, p, is calculated from the following set of equations. First, the method determines the variance change that is normally produced in propagating the covariance using the approximation to the state transition matrix shown in Equation 9:

$$\delta\Delta P = -(\Delta\tau/\tau)\Delta P \quad (12)$$

where $\delta\Delta P$ is the increment to the variance change caused by $\Delta\tau$. The method then relates the variance change to the model validity statistic p, which is computed using Equation 13. Equation 12 is pre-multiplied by the transpose of the measurement gradient vector and post-multiplied by the measurement gradient vector, producing Equation 13:

$$h^T \delta\Delta Ph = -(\Delta\tau/\tau) h^T \Delta Ph \quad (13)$$

The left-hand side of Equation 12 represents the increase to the residual variance, $\sigma^2_{res} = h^T Ph + \sigma_{rm}^2$, corresponding to the variance increase, $\delta\Delta P$. Equating the residual variance increase to the desired change in the statistic p, in order to cause the model for p to converge to a value of one, gives the following result:

$$\Delta\tau = \tau(1-p)/h^T \Delta Ph \quad (14)$$

The increment to the aging time expressed by Equation 14 will produce a value of p equal to one.

Drift Compensation Algorithm

While the vehicle is moving and/or turning, Equation 15 is used to update the gyroscope bias estimate:

$$b_j = b_{j-1} + h^T x \quad (15)$$

where the measurement gradient vector h is computed using the current, measured, average temperature. $(T_{avg})_j = (T_j + T(t_k))/2$, and the coefficients $r_0$, $r_1$, and $r_2$ calculated the bias drift rate filter 38.

Because the coefficients of the polynomial curve fit are not known perfectly, an error variance is assigned to the temperature compensation and used to propagate the variance associated with the gyroscope bias estimate. The error variance for the temperature compensation is $h^T Ph$ based on the model for temperature instability. The gyroscope bias variance propagation equation then is:

$$(\sigma^2_b)_j = (\sigma^2_b)_{j-1} + h^T Ph \quad (16)$$

Equation 16 thus incorporates the effects of improved gyroscope bias calibration as P is reduced by the application of the model. As more and more bias measurements are made, and the model parameters (x) are updated, the covariance matrix P continues to reduced.

The estimated bias calculated in Equation 15 is then used in a third computational means (block 108 in FIG. 7) to calculate a heading and position correction, using Equations 17–22. First a corrected heading ($H_{corr}$) and a change in heading ($\Delta H$) are calculated as shown in Equations 17–18:

$$H_{corr,j} = H_{corr,j-1} + b_j \quad (17)$$

$$\Delta H_j = H_{corr,j} - H_{corr,j-1} \quad (18)$$

Next, corrected east and north position changes, $\Delta P_{ecorr}$ and $\Delta P_{ncorr}$ respectively are calculated in a fourth computational means (block 110 in FIG. 7) using Equations 19–20:

$$\Delta p_{ecorr,j} = \Delta p_{ecorr,j-1} + \Delta p_{e,DRS,j} \Delta H_{corr,j}/2 \quad (19)$$

$$\Delta p_{ncorr,j} = \Delta P_{ncorr,j-1} + \Delta p_{n,DRS,j} \Delta H_{corr,j}/2 \quad (20)$$

where $\Delta P_{e,DRS}$ is the change in east position calculated by the dead reckoning system and $\Delta p_{n,DRS}$ is the change in north position calculated by the dead reckoning system.

Finally, latitude (L) and longitude (λ) are calculated as shown in Equations 21–22:

$$L = L - \Delta p_{ncorr,j}/R_e \quad (21)$$

$$\lambda = \lambda - \Delta p_{ecorr,j}/(R_e \cos L) \quad (22)$$

where $R_e$ is the Earth's equatorial radius.

In an alternative embodiment, the corrected bias and the corrected dead reckoning heading and position can be used in conjunction with a global positioning system to provide further corrections to the vehicle heading and position, using the methods described in co-owned, co-pending application Ser. No. 09/678,598, Attorney Docket number 99,989, now U.S. Pat. No. 6,401,036 which is incorporated herein by reference. In these methods, the corrected DRS heading calculated by applying the heading sensor bias estimate to the heading calculated by the DRS is combined in a fifth computational means (block 112 in FIG. 7) with a heading provided by the global positioning system to determine an integrated vehicle heading. Preferably, the fifth computational means is a Kalman filter. An integrated vehicle position is then calculated in a sixth computational means (block 114 in FIG. 7) using the integrated vehicle heading, the corrected DRS position calculated by applying the heading sensor bias estimate to the position calculated by the DRS, and the global positioning system position. Preferably the sixth computational means is a Kalman filter.

The invention is more fully illustrated in the following Examples. These Examples illustrate certain aspects of the invention. These Examples are shown by way of illustration and not by way of limitation.

EXAMPLE 1

Temperature Dependence of Gyroscope Bias

Figure 2:
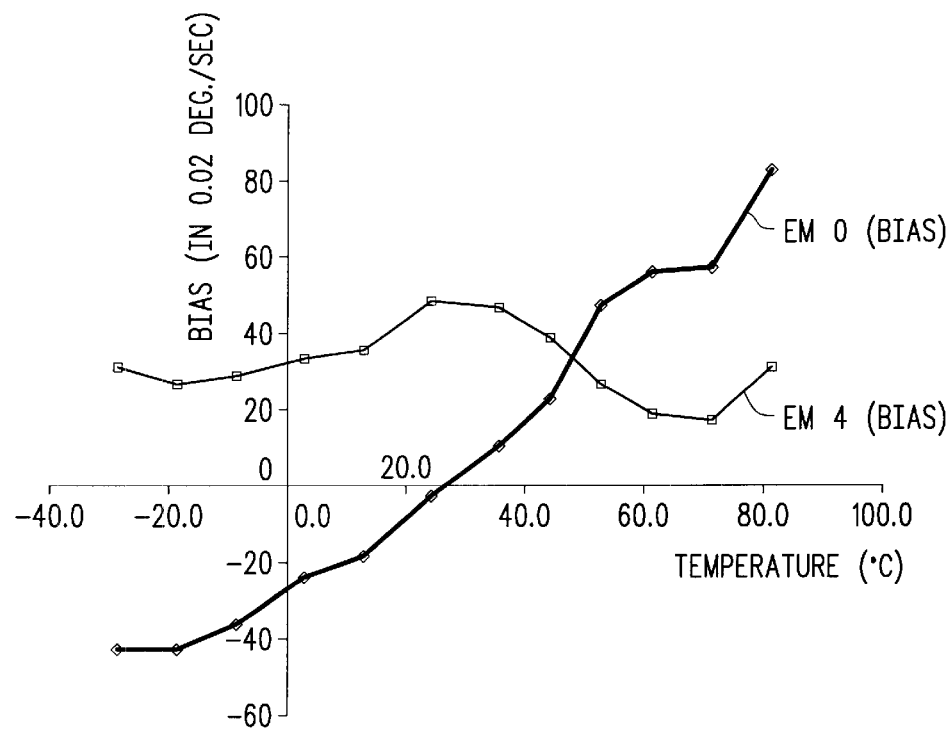
FIG. 2 is a graphical illustration of the temperature dependence of two representative gyroscopes.
Figure 3:
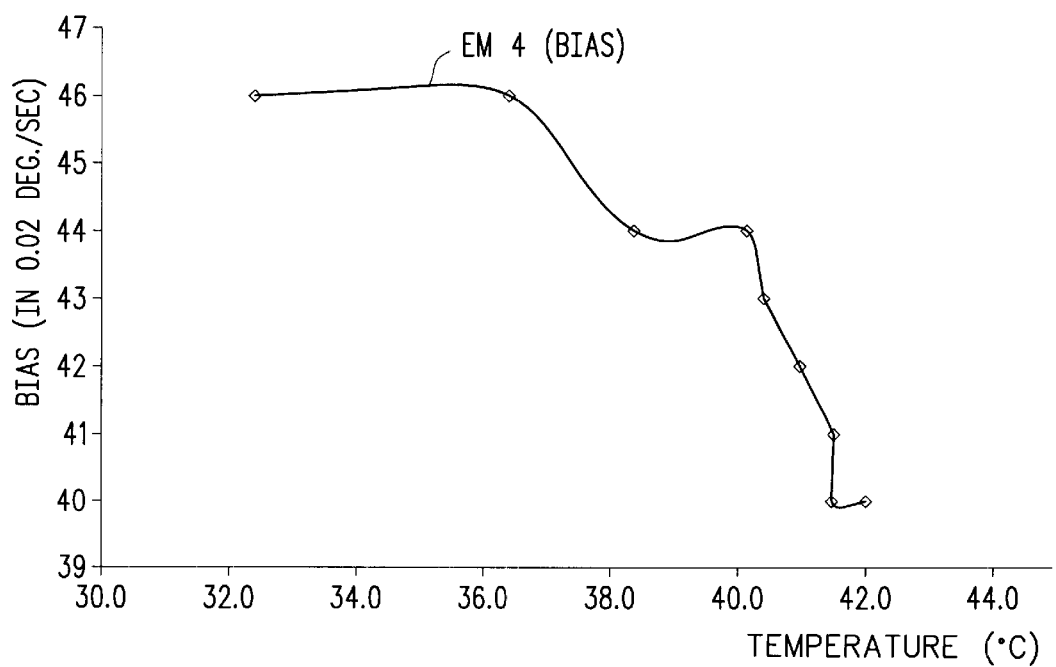
FIG. 3 is a graphical illustration of error induced in bias measurements by sensor quantization.

The temperature dependence of the bias of two Murata ENV-05D-52 gyroscopes was tested by exposing the gyroscopes to a range of temperature from −28.5 degrees C. to 81.5 degrees C. The results are shown in Table 1 and illustrated in FIGS. 2 and 3.

TABLE 1

| TEMP. ° C. | GYRSOSCOPE 1 (bias in 0.02 deg./sec) | GYROSCOPE 2 (bias in 0.02 deg./sec) |
|---|---|---|
| −28.5 |  | 30 |
| −27.5 | −43 |  |
| −18.0 |  | 27 |
| −17.5 | −43 |  |
| −7.5 | −37 |  |
| −7.0 |  | 28 |
| 2.5 |  | 32 |
| 3.5 | −25 |  |
| 12.0 |  | 34 |
| 13.5 | −19 |  |
| 22.5 |  | 48 |
| 24.0 | −4 |  |
| 32.0 |  | 46 |
| 34.5 | 8 |  |
| 41.5 |  | 39 |
| 43.0 | 23 |  |
| 51.0 |  | 27 |

TABLE 1-continued

| TEMP. ° C. | GYRSOSCOPE 1 (bias in 0.02 deg./sec) | GYROSCOPE 2 (bias in 0.02 deg./sec) |
|---|---|---|
| 51.5 | 46 |  |
| 61.0 | 57 |  |
| 61.5 |  | 19 |
| 70.5 | 58 |  |
| 71.5 |  | 18 |
| 80.5 | 82 |  |
| 81.5 |  | 30 |

The effect of sensor quantization on the gyroscope bias measurement was demonstrated by repeatedly measuring the bias for a gyroscope at a single temperature. The results of this test for gyroscope 2 are given in Table 2.

TABLE 2

| TEMP. ° C. | GYROSCOPE 2 (BIAS) |
|---|---|
| 32.5 | 46 |
| 36.5 | 46 |
| 38.5 | 44 |
| 40.0 | 44 |
| 40.5 | 43 |
| 41.0 | 42 |
| 41.5 | 41 |
| 41.5 | 41 |
| 41.5 | 40 |
| 41.5 | 40 |
| 41.5 | 40 |
| 41.5 | 40 |
| 42.0 | 40 |

EXAMPLE 2

Temperature-Dependent Bias Drift Correction

To demonstrate the effectiveness of the invention, the algorithm was tested using a Toyota Camry test vehicle with an integrated GPS/DR system, including a Murata low cost vibrational gyroscope and an interface to the vehicle's odometer. The vehicle traveled directly west for approximately 3 kilometers with the GPS antenna disconnected. The vehicle did not stop during the test run. Uncompensated test data are shown in FIG. 4.

The temperature increase during the test was relatively uniform. Bias drift was compensated using a polynomial curve fit derived off-line in laboratory tests of the gyroscope bias drift rate resulting from a uniform temperature increase over the expected operating temperature range of the gyroscope. Over the range of temperatures present during the test run, the gyroscope bias drift rate was effectively constant at a value of approximately 0.037 deg/sec/deg-C.

Figure 4:
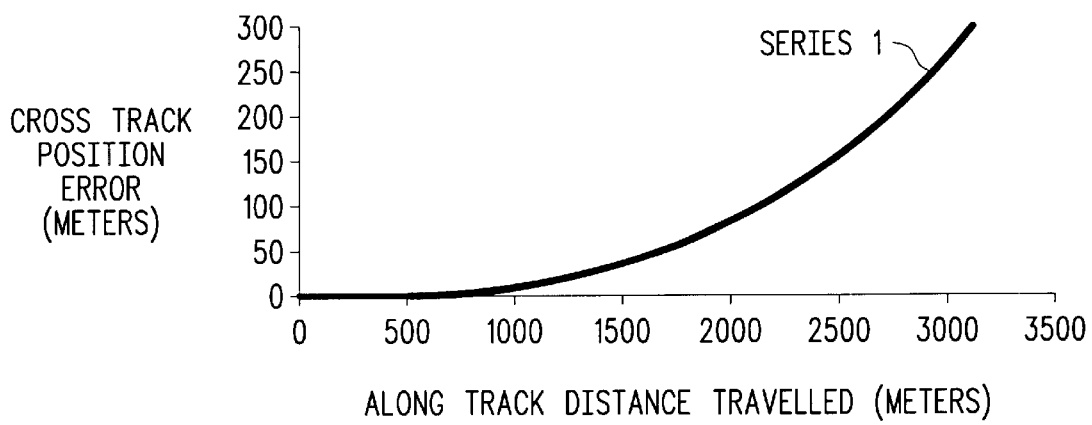
FIG. 4 is an illustration of a sample test data of an uncompensated open loop performance.
Figure 5:
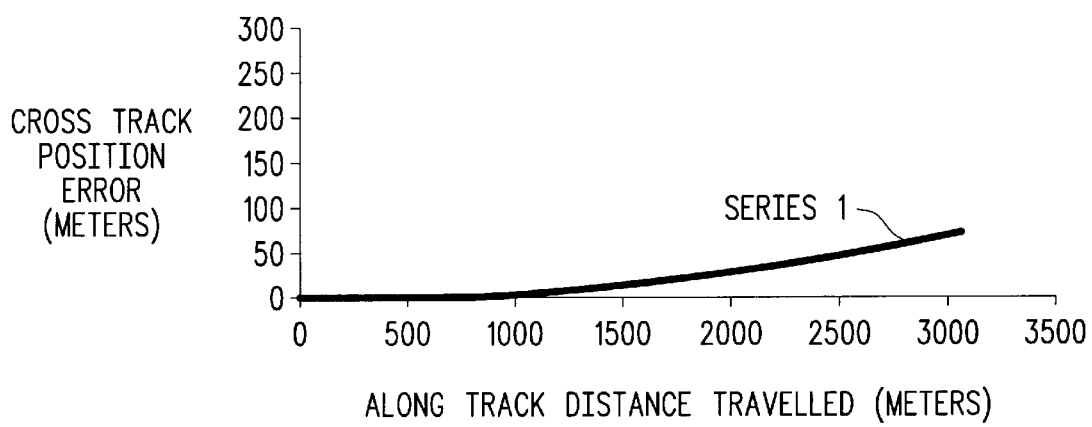
FIG. 5 is an illustration of the resulting compensated trajectory.

As illustrated in FIG. 4, significant cross-track error developed in the uncompensated system during the test run. The uncompensated cross-track error was 9.7% of the total distance-traveled. The dominant contributor to this error growth was gyroscope bias drift. The derived heading and gyroscope bias estimates were compensated off-line using the algorithm of the current invention in an Excel spreadsheet. FIG. 5 displays the resulting compensated trajectory. The significant reduction of cross-track position error to 2.4% of total distance-traveled demonstrates the effectiveness of the invention.

A preferred embodiment of the present invention has been illustrated and described. It will be understood, however, that changes and modifications may be made to the invention without deviating from the spirit and scope of the invention, as defined by the following claims.

What is claimed is:

1. A navigational system for a vehicle having built-in error correction comprising:
   (a) a heading sensor having a bias that drifts over time and capable of measuring heading data;
   (b) a temperature sensor capable of measuring temperature data;
   (c) a dead reckoning component having a heading sensor interface and a temperature sensor interface, wherein the dead reckoning component receives the heading data from the heading sensor and the temperature data from the temperature sensor;
   (d) a first computational means for determining whether the vehicle is at a stationary point;
   (e) if the vehicle is at the stationary point, a second computational means for generating a temperature-based calibration curve for an estimated bias drift rate, the estimated bias drift rate at the stationary point being a ratio of a change in bias between the stationary point and a prior stationary point by a change in temperature between the stationary point and the prior stationary point, the calibration curve being modeled by an expression as a function of a plurality of coefficients calculated by a filter, a current temperature measured at the stationary point, and a prior temperature measured at the prior stationary point;
   (f) a third computational means for calculating a corrected vehicle heading using the temperature-based calibration curve for the estimated bias drift rate to compensate for vehicle heading errors induced by heading sensor bias drift; and
   (g) a fourth computational means for calculating a corrected vehicle position using at least the corrected vehicle heading to compensate for vehicle position errors induced by heading sensor bias drift.

2. The navigation system of claim 1 wherein the heading sensor is a gyroscope.

3. The navigation system of claim 1 wherein the heading sensor is a low-cost gyroscope.

4. The navigation system of claim 1 wherein the heading sensor is a vibrational gyroscope.

5. The navigation system of claim 1 wherein the first computational means for determining whether the vehicle is at the stationary point includes at least a distance-traveled sensor.

6. The navigation system of claim 1 wherein the dead reckoning component further comprises a dead reckoning processor.

7. The navigation system of claim 1 wherein the calibration curve for the estimated bias drift rate further includes an aging time parameter that is representative of an expected time interval over which a temperature coefficient will remain relatively constant.

8. The navigation system of claim 1 further comprising a reference vehicle position system.

9. The navigation system of claim 8 wherein the reference vehicle position system is a satellite-based positioning system.

10. The navigation system of claim 9 wherein the satellite-based positioning system is the global positioning system.

11. The navigation system of claim 10 wherein the global positioning system component comprises an antenna and a receiver.

12. The navigation system of claim 11 further comprising a global positioning system processor.

13. The navigation system of claim 8 further comprises a fifth computational means for combining the corrected vehicle heading calculated by the third computational means and a second vehicle heading provided by the reference vehicle position system into an integrated vehicle heading and a sixth computational means for combining the corrected vehicle position calculated by the fourth computational means and a second vehicle position provided by the reference vehicle position system into an integrated vehicle position.

14. The navigation system of claim 13 wherein the fifth computational means comprises a Kalman filter.

15. The navigation system of claim 13 wherein the sixth computational means comprises a Kalman filter.

16. The navigation system of claim 1 further comprising an application specific device.

17. The navigation system of claim 16 wherein the application specific device is a unit for matching the corrected vehicle position with a map contained in the application specific device.

18. The navigation system of claim 19 further comprising a unit for displaying the map contained in the application specific device and identifying the corrected vehicle position on the displayed map.

19. The navigation system of claim 16 wherein the application specific device comprises a transmitter, wherein the transmitter transmits the corrected vehicle position to a service center having a receiver.

20. A method for correcting temperature-dependent sensor bias drift in a navigational system for a vehicle comprising a heading sensor, a temperature sensor, and a dead reckoning component, comprising the steps of:
   (a) transmitting heading data from the heading sensor to the dead reckoning component and storing the heading data in the dead reckoning component;
   (b) transmitting temperature data from the temperature sensor to the dead reckoning component and storing the temperature data in the dead reckoning component;
   (c) determining whether the vehicle is at a stationary point;
   (d) if the vehicle is at the stationary point, generating a temperature-based calibration curve for an estimated bias drift rate, the estimated bias drift rate at the stationary point being a ratio of a change in bias between the stationary point and a prior stationary point by a change in temperature between the stationary point and the prior stationary point, the calibration curve being modeled by an expression as a function of a plurality of coefficients calculated by a filter, a current temperature measured at the stationary point, and a prior temperature measured at the prior stationary point.

21. The method of claim 20, wherein the navigation system further has a central processing unit and a computer readable medium, the computer readable medium having instructions for causing the central processing unit to perform the steps of the method.

22. The method of claim 20 wherein the method is iterated periodically.

23. The method of claim 22 wherein the method is iterated at a frequency of 1 iteration per second.

24. The method of claim 20 further comprising the step of using a temperature sensor bias drift rate aging time parameter to force convergence of an error variance matrix of the filter.

25. The method of claim 24 wherein the aging time parameter is updated at the stationary point.

26. A method for correcting heading and position error induced by temperature-dependent heading sensor bias drift in a navigational system for a vehicle comprising a heading sensor, a temperature sensor, and a dead reckoning component, comprising the steps of:
   (a) transmitting heading data from the heading sensor to the dead reckoning component and storing the heading data in the dead reckoning component;
   (b) transmitting temperature data from the temperature sensor to the dead reckoning component and storing the temperature data in the dead reckoning component;
   (c) determining whether the vehicle is at a stationary point;
   (d) if the vehicle is at the stationary point, generating a temperature-based calibration curve for an estimated bias drift rate, the estimated bias drift rate at the stationary point being a ratio of a change in bias between the stationary point and a prior stationary point by a change in temperature between the stationary point and the prior stationary point, the calibration curve being modeled by an expression as a function of a plurality of coefficients calculated by a filter, a current temperature measured at the stationary point, and a prior temperature measured at the prior stationary point;
   (e) estimating a corrected vehicle heading using at least the temperature-based calibration curve for the estimated bias drift rate;
   (f) estimating a corrected vehicle position using at least the corrected vehicle heading.

27. The method of claim 26, wherein the navigation system further has a central processing unit and a computer readable medium, the computer readable medium having instructions for causing the central processing unit to perform the steps of the method.

28. A method for correcting heading and position error induced by temperature-dependent heading sensor bias drift in a navigational system for a vehicle comprising a heading sensor, a temperature sensor, a global positioning system, and a dead reckoning component, comprising the steps of:
   (a) transmitting heading data from the heading sensor to the dead reckoning component and storing the heading data in the dead reckoning component;
   (b) transmitting temperature data from the temperature sensor to the dead reckoning component and storing the temperature data in the dead reckoning component;
   (c) transmitting global positioning data from the global positioning system to the dead reckoning component and storing the global positioning data in the dead reckoning component;
   (d) determining whether the vehicle is at a stationary point;
   (e) if the vehicle is at a stationary point, generating a temperature-based calibration curve for an estimated bias drift rate, the estimated bias drift rate at the stationary point being a ratio of a change in bias between the stationary point and a prior stationary point by a change in temperature between the stationary point and the prior stationary point, the calibration curve being modeled by an expression as a function of a plurality of coefficients calculated by a filter, a current temperature measured at the stationary point, and a prior temperature measured at the prior stationary point;
   (f) estimating a corrected vehicle heading using at least the temperature-based calibration curve for the estimated bias drift rate;
   (g) estimating a corrected vehicle position using at least the corrected vehicle heading;
   (h) calculating an integrated vehicle heading using at least the corrected vehicle heading and the global positioning data transmitted from the global positioning system; and
   (i) calculating an integrated vehicle position using at least the corrected vehicle position and the global positioning data transmitted from the global positioning system.

29. The method of claim 28, wherein the navigation system further has a central processing unit and a computer readable medium, the computer readable medium having instructions for causing the central processing unit to perform the steps of the method.

* * * * *